US008499429B2

(12) United States Patent
Helferich et al.

(10) Patent No.: US 8,499,429 B2
(45) Date of Patent: Aug. 6, 2013

(54) METHOD FOR APPLYING A SURFACE STRUCTURE TO A SOLID BODY AND SOLID BODY PROVIDED WITH SUCH A SURFACE STRUCTURE

(75) Inventors: Günter Helferich, Pfinztal (DE); Lars Ziegler, Zell (DE); Peter Elsner, Pfinztal (DE); Thomas Keicher, Karlsruhe (DE); Peter Eyerer, Karlsruhe (DE); Bernd Bader, Kronau (DE); Helfried Urban, Bretten (DE); Christian Anselment, Karlsruhe (DE); Andreas Happ, Karlsruhe (DE); Wolfgang Merz, Schömberg (DE)

(73) Assignee: Fraunhofer-Gesellschaft zur Foerderung der angewandten Forschung e.V., München (DE)

( * ) Notice: Subject to any disclaimer, the term of this patent is extended or adjusted under 35 U.S.C. 154(b) by 283 days.

(21) Appl. No.: 12/737,422

(22) PCT Filed: Jun. 16, 2009

(86) PCT No.: PCT/EP2009/004319
§ 371 (c)(1),
(2), (4) Date: Jan. 12, 2011

(87) PCT Pub. No.: WO2010/009787
PCT Pub. Date: Jan. 28, 2010

(65) Prior Publication Data

US 2011/0099784 A1 May 5, 2011

(30) Foreign Application Priority Data

Jul. 22, 2008 (EP) .................................... 08013139

(51) Int. Cl.
*B23P 17/00* (2006.01)

(52) U.S. Cl.
USPC ......................................................... 29/421.2

(58) Field of Classification Search
USPC .................... 29/421.2, 458, 460, 469; 72/56, 72/430, 706, 54
See application file for complete search history.

(56) References Cited

U.S. PATENT DOCUMENTS

| | | | | |
|---|---|---|---|---|
| 2,604,042 A | | 7/1952 | Cook | |
| 3,646,792 A | | 3/1972 | Hertel | |
| 6,044,677 A | * | 4/2000 | Ziegler et al. | 72/56 |

FOREIGN PATENT DOCUMENTS

| | | |
|---|---|---|
| DE | 10 2004 017094 | 11/2005 |
| EP | 0 937 562 | 8/1999 |
| FR | 2 040 910 | 1/1971 |
| WO | WO 01/17754 | 3/2001 |

* cited by examiner

*Primary Examiner* — John C Hong
(74) *Attorney, Agent, or Firm* — Paul Vincent

(57) ABSTRACT

In a method for applying a surface structure to a solid body, a structured surface is placed directly or indirectly onto the surface of the solid body and the structure of this structured surface is reproduced in the surface of the solid body, in that an explosive structured layer is arranged on the surface of the solid body and the structure of the explosive structured layer is explosively disseminated into the surface of the solid body. According to the invention, the surface of the solid body is provided with a surface pre-structure before the actual dissemination, at least in regions, wherein the structure of the explosive structured layer is disseminated on at least one partial region of the surface pre-structure so that the surface structure produced results from overlapping of the surface pre-structure with the explosively disseminated structure.

19 Claims, No Drawings

METHOD FOR APPLYING A SURFACE STRUCTURE TO A SOLID BODY AND SOLID BODY PROVIDED WITH SUCH A SURFACE STRUCTURE

This application is the national stage of PCT/EP2009/004319 filed on Jun. 16, 2009 and also claims Paris Convention priority of EP 08013139.4 filed Jul. 22, 2008.

BACKGROUND OF THE INVENTION

The invention relates to a method for applying, at least in regions, a surface structure to a solid body, wherein a structured surface is placed directly or indirectly onto the surface of the solid body and the structure of this structured surface is reproduced in the surface of the solid body, in that an explosive structured layer having the structured surface is arranged on the surface of the solid body is disseminated by ignition of the same in the surface of the solid body; and/or at least one moulded structured layer having the structured surface is arranged on the surface of the solid body and is disseminated in the surface of the solid body by igniting a separate explosive layer.

The invention also relates to the use of such a method and to a solid body produced in particular by means of such a method, with an at least partially region-based surface structure.

A method according to the preamble of claim 1 is disclosed in EP 0 937 562 A1, the entire disclosure of which is hereby incorporated by reference. According to the method disclosed in the aforementioned publication a structured surface, e.g. in the form of synthetic leather, leather or other natural materials or substances such as the leaves of plants, fabrics or other decorative materials, is placed on the surface of the workpiece and is covered with an explosive layer that is generally as thin as possible, such as an explosive film or even liquid or molten, pasty or viscous explosives, so that the moulded structured layer having the structured surface is located between the explosive layer and the solid body or workpiece to be structured. The explosive is then ignited and the surface structure is therefore reproduced in the surface of the workpiece. The quantity and/or type of explosive is in this case preferably chosen so that the workpiece is not massively transformed but where, on the one hand, a relatively high detonation pressure with a steep pressure rise is nevertheless developed during the transformation of the explosive, which provides a reproduction of even very soft materials, such as a natural leaf. On the other hand the pressure, in addition to a material of high Impedance, rises substantially on the contact surface so that the critical load stress of the material to be processed is exceeded. In this case the structured surface can be arranged, according to the desired optical effect, directly on the surface of the workpiece or indirectly, i.e. with the intermediate arrangement of further layers, e.g. flat intermediate layers of paper or sheet steel, or even intermediate layers of air or liquids, where in the latter case the detonation pressure is damped and sharp edges of the disseminated surface structure can be avoided, for example. Alternatively, instead of placing a structured surface on the workpiece, it is proposed that the explosive itself, which is solid in this case, be provided with such a structure that this explosive structured layer is then disseminated into the surface of the workplace at the time of ignition of the explosive. It is also conceivable to form the above-mentioned intermediate layer, which is solid in this case, in turn with such a structure that the surface structure disseminated into the workpiece results on the one hand from a overlapping of the structure of the structured surface, and on the other from the structure of the intermediate layer, whereby special optical effects or multi-stage surface structures of the workpiece can be achieved. The workpieces surface structured in this way are, in particular, moulding tools, e.g. for plastic processing, or forming tools, such as erosion electrodes, which then transfer the explosively disseminated surface structure to the moulding produced.

This method, also known as "explosive embossing", has a number of advantages over conventional methods for surface structuring, such as irradiation techniques, galvanising etc. For instance, it can, in particular, be carried out very quickly and inexpensively, and even very complex structures, as well as natural structures (leather grain effect, leaf arteries, etc.), can be reproduced.

The object of the invention is to develop a method of the type just mentioned to the extent that the complexity of the surface structure produced can be further increased in order, in particular, to develop new applications for the method. It is also focussed on the use of such a method and on solid bodies which have a surface structure produced by such a method.

SUMMARY OF THE INVENTION

From the methodological point of view this object is achieved in the method of the type already mentioned in that the surface of the solid body is provided, at least regionally, with a surface pre-structure before explosion, the structure of the explosive structured layer or the moulded structured layer being imposed on at least a partial region of the surface pre-structure so that the surface structure produced results from an at least regionally overlapping of the surface pre-structure with the disseminated structure.

In the case of a solid body produced, in particular, by such a method, with an at least regional surface structure, the invention also provides, in order to achieve the object mentioned, that the surface structure is formed from a overlapping of a surface pre-structure applied to the solid body and a structure explosively disseminated at least regionally onto it.

DESCRIPTION OF THE PREFERRED EMBODIMENT

The invention allows the relatively simple, inexpensive production of extraordinarily complex surface structures of the solid body, which structures have not hitherto been reproducible according to the state of the art. In this case the invention makes it possible, particularly for the falsification protected identification of objects and of moulding and forming tools, for these objects to be used, in which case, as will be explained in greater detail below, either the objects themselves or the moulding and forming tools can be provided with such a surface structure and can then be transferred onto the object itself.

The invention also offers a number of surprising advantages over a surface structure produced from a overlapping of a structured surface and an intermediate layer arranged underneath it, as disclosed in EP 0 937 562 B1 already cited. For example, considerably more degrees of freedom in terms of the final surface structure are possible due to the pre-structuring of the surface of the solid body, mention being made, solely by way of example, of the possibilities of specific regional (differentiated) hardening of the surface pre-structure or a regionally differentiated depth of the surface pre-structure, which may be substantially deeper, for example, than that of a moulded or explosive structured layer.

In addition, the forming quality of both moulded structured layers, particularly the (upper) layer facing away from the solid body, in the case of a structure formed according to the state of the art, is naturally impaired because both moulded structured layers effect mutual protection or damping. Although the moulded structured layer which is located between the explosive layer and the other moulded structured layer is subject to the entire pressure loading when the explosive is detonated (shock wave, vapour pressure), its structure must be reproduced through the other moulded structured layer, which generally results in not inconsiderable quality losses. The other (lower) moulded structured layer is not therefore reproduced with the precision that would otherwise be possible either because the explosive is screened by the (upper) moulded structured layer facing away from the solid body and therefore damps the explosive effect. Moreover, each interface or each moulded structured layer generates reflections of the pressure wave generated at the time of detonation of the explosive, thereby additionally impairing reproduction quality. In this case two additional interfaces (front and back) are present compared to a moulded structured layer, even if there are two such layers.

It is also apparent from this that the required explosive layer which, as already mentioned, should not generally result in an appreciable massive transformation of the solid body to be provided with a surface structure, is smaller in the case of only one moulded structured layer than in the case of two or more moulded structured layers, which means that the loading of the solid body is lower and, in particular, that any secondary effects, such as a plastic deformation of the solid body, can be reliably avoided. Because of the smaller quantity of explosive, the actual explosion process also requires fewer protective measures, such as those relating to safe distances to be adhered to, protection against explosive emissions in the form of noise, vapour, etc.

Moreover, the pre-structuring of the workpiece can be much less expensive than the separate production of a moulded structured layer as an intermediate layer, which must satisfy the above-mentioned criteria relating to permeability of the pressure wave, the forming of its moulded contour by the (lower) moulded structured layer etc. This also applies, in particular, when the surface pre-structure can also already be produced during the process of manufacturing the solid body (e.g. by means of a moulding tool).

In terms of a falsification protected identification of objects in particular, whether by explosion the surface structure directly onto the object or onto a moulding or forming tool for such an object, the method according to the invention also provides a number of modification possibilities to provide an individual surface structure and one which could not otherwise be reworkable, which structure provides the maximum possible protection against imitations. It is therefore possible, for example, to align the surface of the solid body, to be provided with a surface structure and equipped with a surface pre-structure, in the upward or "North" direction, and to arrange the moulded structure layer and the explosive layer or the explosive structured layer on it, whilst conversely the surface of the solid body can also be aligned in the downward or "South" direction in order to arrange the moulded structured layer and the explosive layer or explosive structured layer underneath it, in which case different effects can be achieved. It is also possible, for example, to provide a variable arrangement of the ignition point and/or for an inhomogeneous distribution of the explosive layer or explosive structured layer in order to guarantee varying degrees of overlapping of the surface pre-structure with the structure overlapped it within the surface structure produced. Finally a region of the solid body provided with the surface pre-structure and/or the moulded or explosive structured layer overlapped it can be largely flat or at least partially curved, or alternatively, or additionally, the latter may have a homogeneous or inhomogeneous thickness, thereby enabling specifically different degrees of forming to be achieved within one and the same structure of the solid body, which may in turn contribute to an even further increase in the falsification protection of such objects.

As moulded structures use may be made in particular, in addition to the natural materials disclosed in EP 0 937 562 B1, of artificially produced moulded structures which may be present, for example, on thin metal plates, so-called "shims". Materials suitable for this include primarily metals and their alloys, for example nickel (alloys), aluminium (alloys) and the like. Such nickel shims are currently produced, for example, by applying the structure to a suitable substrate, so-called "photoresists", by means of a laser, followed by electrochemical deposition of nickel on the structured substrate, where the deposited nickel layer which, after its electrochemical deposition, carries a negative image of the structure of the substrate, is then pulled off the substrate. A plurality of "daughter shims" can be produced from the structured substrate, also known as the "master shim", by again depositing nickel electrochemically onto the substrate after detachment of the electrochemically deposited nickel layer (i.e. the first "daughter shim"). If a higher degree of forming is to be achieved than is possible with such rather flat materials, the invention provides the possibility of a coating, e.g. carbon-based with an amorphous, diamond-like carbon modification, so-called "diamond-like carbon" (DLC). Such coating materials are commercially available.

Whilst, as already indicated, the surface pre-structure of the solid body can already be applied to the solid body during its actual shaping or even by explosive embossing according to the method disclosed in EP 0 937 562 51, it is also possible, according to the invention, for the surface pre-structure to be produced by the surface machining of the solid body, in particular embossing, erosion, laser structuring, structure etching, engraving and/or brushing. With regard to a falsification protected identification of objects it is also possible, in this case, for the surface pre-structure to be provided in the form of regular and/or irregular structures with defined "defects", i.e. interruptions of the overall pre-structure, which need not necessarily be visible, at least by overlapping with the explosively disseminated structure of the finished solid body, but which can be recognisable only by irradiating with electromagnetic radiation in certain wavelength ranges, such as ultraviolet and/or monochromatic light, etc.

The same then also applies, obviously, to objects which have been produced or treated with moulding or forming tools and which have been provided with such surface structures. In any case the surface pre-structures are specifically by the subsequent explosive embossing process, at least regionally, so that the original pre-structure, e.g. for potential imitators, will no longer be determinable. The structured surface of the moulded or explosive structured layer is destroyed when the same is overlapped the surface pre-structure of the solid body so that in this respect too there is practically no possibility of reproduction of the finished surface structure, particularly as a reproduction of such a structure on a pre-structured solid body surface, as already mentioned above, cannot be achieved exactly, at least without an exact knowledge of these parameters, even in the case of identical moulded structured layers, due to the complexity of explosive embossing, i.e. its dependence on various other process parameters.

According to a preferred embodiment of the method according to the invention provision can be made for the explosive structured layer or the moulded structured layer and/or the surface pre-structure of the solid body to be designed so that it forms a regular or irregular arrangement of adjacent elevations and recesses, in particular with dimensions ranging from 10 nm to 5000 μm, e.g. in the range between approx. 10 nm and approx. 1000 μm, or in the range between approx. 100 nm and approx. 1000 μm. The adjacent elevations and recesses can in this case be formed, for example, from peaks and valleys of the same and/or different height running in the form of straight and/or curved lines and/or arranged essentially in punctiform fashion, in which case its cross-sectional profile may, in particular, be approximately sinusoidal, e.g.—although not necessarily—with an approximately constant amplitude of the sinusoidal course. In such a particular design of the surface pre-structure of the solid body, the material present on the elevations of the surface pre-structure is able to deflect the structured surface of the moulded or explosive structured layer, according to its structure, into adjacent recesses due to the pressure surge when explosively disseminated, thereby enabling a significantly more visible and individual or falsification protected surface structure to be produced by partially "smoothing" the surface pre-structure. In this manner, for example, regions in the finished surface structure can also be produced with very different reflexion properties, such as regions that appear both mat and brilliant within one and the same surface structure.

In another advantageous embodiment provision can be made for the explosive structured layer or the moulded structured layer and/or the surface pre-structure of the solid body to be designed so that it/they form/s a hologram. In this connection "hologram" refers to diffractive structures which, when irradiated with light, generate images that appear to be three-dimensional, including diffraction grating, so-called holographs. In this context, for example, moulded structured layers may be used in the form of metallised holographic films which are explosively disseminated onto the surface pre-structure of the solid body.

If desired an intermediate layer, e.g. in the form of a further moulded structured layer, a liquid (e.g. water) or a gas (e.g. air) can be arranged between the explosive structured layer and the solid body or between the moulded structured layer and the solid body. According to an advantageous design provision may be made in this case for the intermediate layer to be provided in turn with a moulded structure, wherein the moulded structure of the intermediate layer has, in particular, a template, i.e. the intermediate layer may be formed, for example, from a structured or non-structured layer in which a regular or irregular pattern is punched out so that during the explosion process the pressure wave passes undamped through the recessed region of the intermediate layer, whilst outside the recessed region of the intermediate layer it undergoes damping, which, particularly when combined with a overlapping of the surface pre-structure, is able to provide further structures that are practically non-reproducible and are therefore extremely falsification protected.

As already indicated, an object to be provided with a falsification protected identification, on which a positive image of the structure is reproduced, can be used as the solid body according to a design variant of the invention. Such objects may be practically any objects, particularly objects of high value, in which a falsification protected identification may be appropriate, whether as protection against imitations or as protection against theft, for example on the chassis of motor vehicles or on the frames of motorcycles or bicycles, clocks, jewellery, cameras, (coded) safety doors, machines (machine parts) or other equipment and parts of the same.

As also already indicated, provision may be made, according to a further design variant of the method according to the invention, for a moulding or forming tool or part of the same to be used as the solid body, onto which a positive or negative image of the structure is reproduced, i.e. the desired structure is first reproduced onto the moulding or forming tool and transferred by it onto the object produced or correspondingly machined on it. "Moulding or forming tools", within the meaning of the invention, refer on the one hand to tools which are used to shape, in particular, metal or plastic mouldings, e.g. injection moulds, casting moulds or the like, and on the other hand to tools which are suitable for forming structures on objects of any materials, such as metal or plastic, but also paper, cardboard etc. One embodiment of the method according to the invention therefore provides that a moulding or forming tool from the group plastic moulding tools and plastic moulding tool inserts, casting moulds, erosion electrodes, embossing, rolling-off, burning, impact, welding and eroding rolls and punches, seals, pressure plates and rolls be used.

Such forming or moulding tools provided, in particular, with a falsification protected structure, can then be used for transferring this structure to objects which are produced with these tools or are machined with these tools, such objects including, for example, data carriers (such as hard drives, CD's, DVD's, CD-ROM's etc.), tokens, films for packaging materials, bank and credit cards, etc., polymer and paper bank notes or even coins, and sheets of paper provided for important documents, etc. Therefore, as also indicated above, curved surfaces (e.g. those of pressure or embossing rolls) can be provided by the method according to the invention with a surface pre-structure onto which the structure of the moulding or explosive structured layer is explosively disseminated, in which case the possibility of an essentially tubular explosive layer is provided with which the roll is enclosed, in which case the structure generated (pre-structure and/or explosively disseminated structure) need obviously not necessarily extend throughout the length of the lateral surface of the roll, but can also be formed only locally. Obviously the invention also provides the possibility of a "refit" of existing moulding or forming tools by providing them, at least locally, with a surface pre-structure onto which this overlapping structure is explosively disseminated without the tool being damaged by massive forming of the same. It is also possible, for example, instead of a possible direct reproduction of a surface structure onto an object, to carry out an indirect reproduction by means of a forming tool, which may be particularly appropriate when the object is relatively hard (e.g. produced from a steel material). In this case, for example, a negative image of the desired surface structure can be reproduced in a forming tool serving as a structure pattern from a relatively softer material by the method according to the invention, e.g. in a sink erosion electrode of copper, whereupon the sink erosion electrode is used, by such a known method, to provide the—harder—object with the surface structure (as a positive image). A higher degree of forming can therefore be achieved than in the case of direct reproduction of the surface structure onto the hard steel material.

According to a development of the method according to the invention provision can be made for a coating material to be injected into the recesses of the surface pre-structure of the solid body, which material is securely connected on the surface to the solid body material during explosion of the structure of the explosive structured layer or moulded structured layer into the surface pre-structure. In particular, the coating material may, for example, be fine-particulate powder, e.g. on the basis of ceramic, metal (alloys), metal oxide, diamond or the like, which is sintered into the pre-structure when the explosive is ignited. In this way not only further visual and highly individual effects can be achieved, but a very high hardness/abrasion resistance of the surfaced structure of the solid body produced can also be provided, according to the coating material.

Alternatively or additionally, provision can be made for the surface structure produced on the solid body subsequently to be hardened to give the surface structure produced higher durability. In this case practically any hardening process of prior art can be used, depending on the material of the solid body provided with the surface structure, for example cross-linking/vulcanisation, e.g. by irradiation with electromagnetic waves in a suitable wavelength spectrum (radiation cross-linking) in the case of polymeric materials (e.g. in the case of polymer mouldings which have been produced by means of a moulding tool provided with a surface structure, which tool has been manufactured by the method according to the invention, with the forming of the surface structure in the polymer moulding) or of downstream shock weave, conversion, precipitation hardening, strain hardening or the like in the case of metallic materials.

Alternatively or additionally provision can be made, for the same purpose, for the surface structure produced on the solid body then to be coated, in which case practically any coating methods can again be used, such as PVD, CVD, sputtering, film coating, etc. In the case of plastic objects in particular, provided with a surface structure according to the invention, a glass-like coating based on silicon dioxide ($SiO_2$), for example, may also prove advantageous, their hardness or brittleness being modified by the additions of water and/or carbon according to the requirements imposed.

In order to be able to reliably exclude the possibility of abuse, such as impermissible forming on objects of any kind, in the case of moulding or forming tools which have been provided with a surface structure according to the invention, any monitoring means of prior art can obviously also be used, such as tamperproof counters and counters on a base communicating with transponders, for example, the use of numerical codes or barcodes, etc., so that the shaping of any object is reliably recorded. The possibility is also provided of testing the genuineness of the surface structure according to the invention both of such moulding or forming tools and mouldings produced with them, by means of digital signatures, hologram scanners, using the moiré effect, e.g. by using suitable moiré films or the like.

Finally reference is made to the fact that the invention is not limited to the production of falsification protected surface structures but is, on the contrary, also suitable for any other applications in which a surface structure of solid bodies which is, in particular, also very complex, is required. For example, the method according to the invention can also be used to produce surface structures with special optical properties serving, for example, to deflect light and/or refract light, which disperse, for example, diffuse daylight or even direct solar radiation, or subject such light to a specific change of direction (light collector, focuser), thereby providing protection from dazzling and/or antireflexion. Films or linings for windows, buildings, etc. are mentioned as examples.

In addition to this the surface structures produced according to the invention may also be formed with a (micro) roughness so that they are given self-cleaning properties. A method is also conceivable, for example, for producing certain micro- or even nanostructures, for example for cultivating tissues such as natural skin structures.

We claim:

1. A method for applying, at least in regions, a surface structure to a solid body, wherein a structured surface is placed onto a surface of the solid body and the structure of this structured surface is reproduced in the surface of the solid body, the method comprising the steps of:

a) providing the surface of the solid body with a surface pre-structure;

b) disposing, following step a), an explosive structured layer on the surface of the solid body; and c) disseminating the structured surface into the surface of the solid body through explosive ignition of the explosive structured layer, wherein structure of the explosive structured layer is disseminated on at least one partial region of the surface pre-structure to produce a falsification protected surface structure from at least regional overlapping of the surface pre-structure with explosively disseminated structure.

2. The method of claim 1, wherein the surface pre-structure is produced by surface machining of the solid body by milling, erosion, laser structuring, structural etching, engraving and/or brushing.

3. The method of claim 1, wherein at least one of the explosive structured layer and the surface pre-structure of the solid body are structured, disposed and dimensioned to generate a regular or irregular arrangement of adjacent elevations and recesses.

4. The method of claim 3, wherein the arrangement of adjacent elevations and recesses has dimensions ranging from 10 nm to 5000 μm.

5. The method of claim 3, wherein the adjacent elevations and recesses are formed by peaks and valleys of a same and/or different height.

6. The method of claim 5, wherein the adjacent elevations and recesses travel as straight or curved lines.

7. The method of claim 5, wherein the adjacent elevations are disposed in a punctiform manner.

8. The method of claim 1, wherein at least one of the explosive structured layer the surface pre-structure of the solid body are designed to form a hologram.

9. The method of claim 1, further comprising arranging an intermediate layer between the explosive structured layer and the solid body or between the moulded structured layer and the solid body.

10. The method of claim 9, wherein the intermediate layer is provided with a moulded structure.

11. The method of claim 10, wherein the moulded structure of the intermediate layer has a template.

12. The method of claim 1, wherein the solid body is an object which it is to be provided with a falsification protected identification on which a positive image of the falsification protected structure is reproduced.

13. The method of claim 1, wherein the solid body is a moulding or forming tool or part of the same, on which a positive or negative image of the falsification protected structure is reproduced.

14. The method of claim 1, wherein a moulding or forming tool is selected from the group consisting of plastic moulding tools, moulding tool inserts, casting moulds, eroding electrodes, embossing, roll-off, burning, impact, welding and eroding rollers and punches, seals, pressure plates and rollers.

15. The method of claim 1, wherein a coating material is fed at least into recesses of the surface pre-structure of the solid body, the coating material being permanently surface-connected to the solid body material at a time of dissemination of the structure of the explosive structured layer or the moulded structured layer into the surface pre-structure.

16. The method of claim 1, wherein the falsification protected surface structure produced on the solid body is subsequently hardened.

17. The method of claim 1, wherein the falsification protected surface structure produced on the solid body is subsequently coated.

18. The method of claim 1, wherein the explosive structured layer comprises the structured surface.

19. The method of claim 1, wherein the explosive structured layer comprises a moulded structured layer having the structured surface and a separate explosive layer.

* * * * *